US006542872B1

United States Patent
Skubic et al.

(10) Patent No.: US 6,542,872 B1
(45) Date of Patent: Apr. 1, 2003

(54) BRAND POSITIONING WITHIN ELECTRONIC PERSONAL DEVICES

(75) Inventors: Janez Skubic, Hasselby (SE); Patric Lind, Lund (SE); Urban Hedeås, Karlstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/572,669

(22) Filed: May 16, 2000

(51) Int. Cl.[7] .............................................. G60F 17/60
(52) U.S. Cl. ...................................................... 705/16
(58) Field of Search ................... 705/26, 16; 345/169; 235/379, 380, 381

(56) References Cited

U.S. PATENT DOCUMENTS

| | | | |
|---|---|---|---|
| 5,396,264 A | | 3/1995 | Falcone et al. ............. 345/146 |
| 5,530,232 A | * | 6/1996 | Taylor ........................ 235/380 |
| 5,806,045 A | * | 9/1998 | Biorge et al. ................. 705/16 |
| 5,977,975 A | | 11/1999 | Mugura et al. ............. 345/352 |
| 6,049,336 A | | 4/2000 | Liu et al. ................... 345/353 |

FOREIGN PATENT DOCUMENTS

| | | |
|---|---|---|
| EP | 0 717 381 A | 6/1996 |
| EP | 105156 | 11/2000 |
| FR | 2 780 800 A | 1/2000 |

OTHER PUBLICATIONS

Kutler, Jeffrey "Cell Phone–Smart card Hookup for U.S. After Winning Over Europe" Nov. 1998, American Banker, v163, n212, p1+.*
Kiesnoski. Kenneth, "Digital Wallets: Card Issuers Seek to Ease Web Shopping" Oct. 1999, Bank Systems & Technology, v36n10, p26(4).*
Greenberg, Paul A. "Wireless Credit Cards: How Soon and How Persuative?" Feb. 8, 2000, E–Commerce Times, http://www.ecormmercetimes.com/perl/printer/2455.*
"Reorganizing Menu Hierarchy to Best Fit the Individual User", *IBM Technical Disclosure Bulletin*, U.S., IBM Corp., New York, vol. 37, No. 2B, Feb. 1994, pp. 349–350, XP000433874.

* cited by examiner

*Primary Examiner*—Kenneth R. Rice
*Assistant Examiner*—Lynda C. Jasmin
(74) *Attorney, Agent, or Firm*—Jenkens & Gilchrist, P.C.

(57) ABSTRACT

A method and apparatus for providing payment information stored upon an electronic personal device during a transaction is disclosed. A plurality of brand identifiers having payment information associated therewith are stored within a memory of the electronic personal device. A user interface enables a user to provide input to control logic which is responsive to the user inputs for defining a priority order for displaying the brand identifiers. A display enables the brand identifiers to be displayed according to the established priority order.

16 Claims, 2 Drawing Sheets

BRAND POSITIONING WITHIN ELECTRONIC PERSONAL DEVICES

BACKGROUND OF THE INVENTION

1. Technical Field of the Invention

The present invention relates to establishing transactional priorities within an electronic personal device, such as a mobile telephone or personal data assistant, and more particularly, to enabling a user to pre-establish service brand identifier priorities.

2. Description of Related Art

Electronic personal devices such as mobile telephones, personal data assistants, laptop computers, etc. enable users to establish a service account with one network operator or service provider. When electronic personal devices are utilized within e-commerce or regular commerce transactions, the user must establish business relationships with more than a single service provider. For example, purchases for clothing may be made from any number of clothing retailers and automobile repair services may be provided by any number of different repair service providers.

In utilizing an electronic personal device to carry out e-commerce or regular commerce transactions with more than one transaction service provider, the number of transaction service providers contained in the electronic personal device can become difficult to manage. For example, a user might have an electronic personal device storing transaction information for a number of credit card companies (Visa, American Express, Diner's Club, Mastercard) and a number of store provided credit services (Sears, Macy's, Home Depot, Best Buy, etc.). If a large number of these transaction service providers are stored on the electronic personal device, it can become time consuming for the user to scroll through all of the transaction service providers each time a purchase is made. A great benefit would be provided to the user if the electronic personal device could at all times clearly and unambiguously show to a user which service provider or providers should be used at any particular time.

SUMMARY OF THE INVENTION

The present invention overcomes the foregoing and other problems with a method and apparatus for providing the payment information stored within an electronic personal device during a transaction. A memory stores a plurality of brand identifiers for a number of transaction service providers each of which has payment information associated therewith. Control logic responsive to inputs provided via a user interface enable the user to establish a priority order for the brand identifiers stored within the memory.

The control logic may establish the priority order for the brand identifiers according to a specified brand identifier which is always to be listed first, according to a brand identifier providing a best commercial condition in a particular situation and according to predefined sets of rules based on the transaction situation. The control logic may further be used to redefine the established brand identifier priority order in response to new input via the user interface.

The brand identifiers are established on a display via the established priority order in response to activation of the electronic personal device. Alternatively, the electronic personal device may include a communication interface enabling the device to determine a particular service provider involved with a transaction. The control logic displays a brand identifier associated with this service provider that has been identified by the user.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
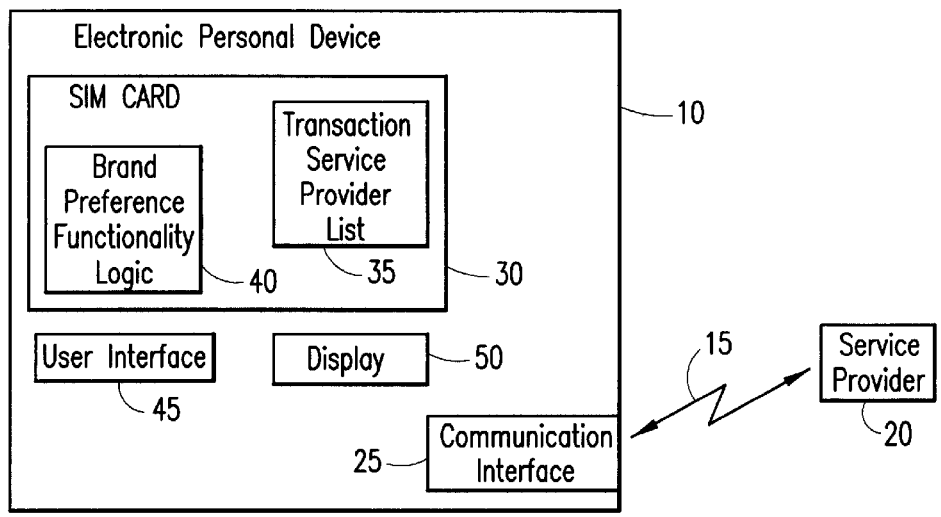
FIG. 1 is a functional block diagram of an electronic personal device including brand preference functionality logic according to the present invention.

Referring now to the drawings, and more particular to FIG. 1, there is illustrated a functional block diagram of an electronic personal device 10 having a communication link with a service provider 20. The electronic personal device 10 may consist of a mobile telephone, personal data assistant, laptop computer or any other personal electronic data device capable of storing information relating to various transaction service providers and providing a communication link with a service provider 20.

The communications interface 25 enables the communication link 15 to be established with the service provider 20. The communication interface 25 may comprise a hardwire interface between the electronic personal device 10 and service provider 20 or alternatively, may enable a wireless communications interface 15 between the personal device 10 and service provider 20. In the case of a wireless communications, various systems such as RF communications, IR communications or short rate communications systems, such as Bluetooth, may be utilized to provide the communications link 15.

Electronic personal devices 10, such as a mobile telephone, enable relationships to be established between the electronic personal device 10 and a network operator via a subscriber identity module (SIM) card which stores network provider identity and various service related information. An electronic personal device 10, such as a mobile telephone, may utilized additional SIM cards or chip cards to include additional provider identities and service information for other types or providers such as transaction service providers enabling purchases using the electronic personal device 10 with service providers 20. The additional provider identity and service related information alternatively may be stored in a memory or hardware within the electronic personal device 10.

The transaction service provider information list 35 stored in the SIM card 30 or other memory may be organized responsive to the brand preference functionality logic 40. The information includes a list of brand identifiers having payment information associated therewith. The brand preference functionality logic 40 enables a user to establish a predetermined preference priority order for the transaction service provider list 35 stored within the electronic personal device 10.

The brand preference functionality logic 40 is programmable by the user, and preferences established by the logic 40 may be changed at the user's discretion by entering new information through the user interface 45. The brand preference functionality logic 40 enables the user to specify the order of preference of various brand identifiers, specify that particular brand identifiers will always appear at the top of a brand identifier listing on the display 50, specify that a particular brand identifier will always be used in a particular case, specify that the brand identifier providing the best commercial conditions should be displayed in a given circumstance, and specifying that particular brand identifiers are displayed for particular predefined situations.

The brand preference functionality logic 40 is responsive to user inputs received via the user interface 45 and controls the manner in which the transaction service provider list 35 is presented in a display 50 of the electronic personal device 10. The brand preference functionality logic 40 is responsive to incoming signals received from a service provider 20 via the communications interface 25. In this situation, the service provider transmits an identification signal which would be received by the electronic personal communications device 10 via the communications interface 25. The brand preference functionality logic 40 would identify the service provider from the identification signal and provide the transaction service provider most appropriate from the transaction service provider list 35 to the display 50. In this way, the user would not have to manually search through their list 35 of transaction service providers but would automatically be provided with the proper transaction service provider or providers depending upon where the user of the electronic personal device 10 was presently transacting business.

Figure 2A:
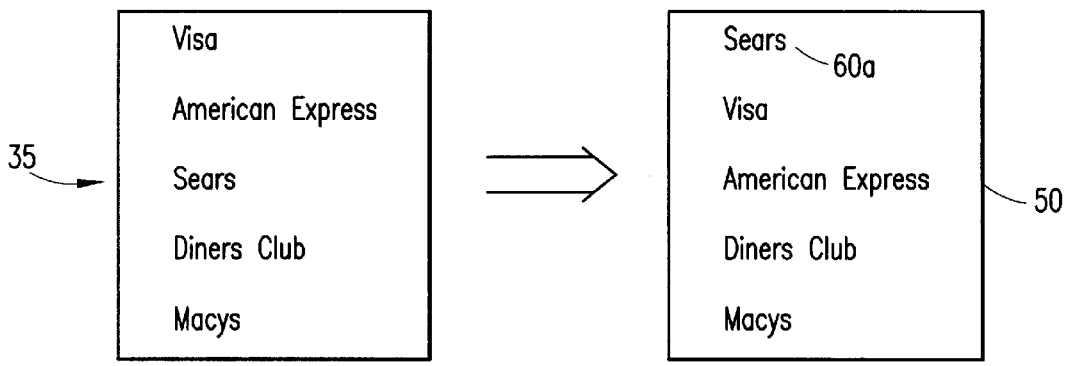
FIGS. 2a and 2b illustrate the manner in which a number of stored transaction service providers may be presented for display according to the present invention.
Figure 2B:
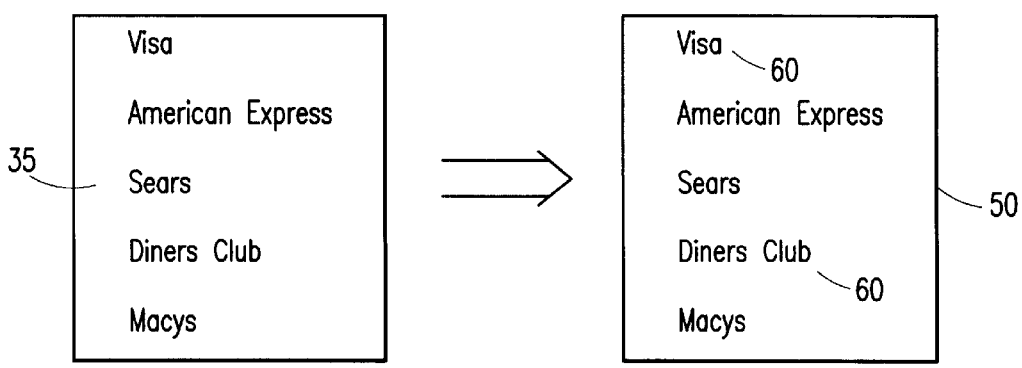

Referring now to FIGS. 2a and 2b, there are provided graphical illustrations of the process performed by the brand preference functionality logic 40. The transaction service provider list 35 includes a number of providers and information relating thereto for a number of credit card providers, bank companies, etc. The list 35 in FIG. 2 comprises a memory storage location including information on a Visa charge card, an American Express charge card, a Sears charge card, a Diner's Club charge card and a Macy's charge card. This list 35 is merely intended to be exemplary and any number of transactions service providers may be included.

The display 50 in FIG. 2a illustrates a manner in which the transaction service providers would be listed if a user was presently located within a Sears retail establishment. The Sears retail establishment would provide some type of identification signal that would be received by the communications interface 25 of the electronic personal device 10. The brand preference functionality logic 40 would recognize that the identifier most relevant to this service provider would be the Sears brand identifier 60a. Thus, this brand identifier would be displayed first on the display 50 or alternatively could be the only brand identifier displayed on display 50. The remainder of the brand identifiers 60 would remain in their user established priority order.

Referring now to FIG. 2b, there is illustrated a situation wherein the brand identifiers 60 are merely presented in a user defined priority order. In this case, the list 35 again contains a number of brand identifiers 60 that have been prestored by the user. Upon activation of the electronic personal device, the brand identifiers 60 are displayed in the order that has been predefined by a user through the user interface 45. In this case, the user has established that the Visa brand identifier 60b is the most important brand identifier 60. The other brand identifiers are listed in their order of priority as indicated by a user. It should be understood that the number of brand identifiers 60 listed upon a display is completely at the control and discretion of the user. In any particular situation, the user may have multiple or single identifiers listed upon the display.

Figure 3:
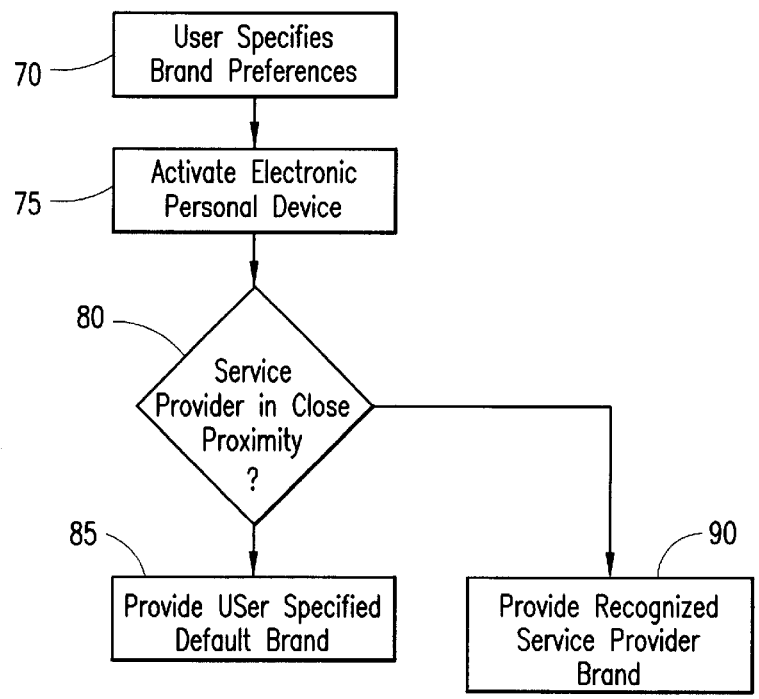
FIG. 3 is a functional block diagram illustrating the operation of the brand preference function logic illustrated in FIG. 1.

Referring now to FIG. 3, there is illustrated a flow diagram describing the operation of the brand preference functionality logic 40 of FIG. 1. Initially, a user specifies at step 70 the brand identifier preferences through the user interface 45. These brand identifier preferences are stored within the brand preference functionality logic 40. The user specified brand identifier preferences establish the number and order of presentation of the brand identifiers 60 upon activation of the electronic personal device 10. Once the electronic personal device 10 is activated at step 75, inquiry step 80 determines whether the electronic personal device 10 is in close proximity to a particular service provider by monitoring for any received service provider identifier on the communications interface 45. If no particular service provider identifier is detected, the brand preference functionality logic 40 causes a user specified brand identifier or brand identifiers to be displayed on the display 50. However, if a particular service provider identifier is detected as being in close proximity, the brand preference functionality logic 40 displays the brand identifier associated with the transaction service provider associated with the detected service provider. The transactions may then proceed utilizing the identified transaction service providers.

Figure 4:
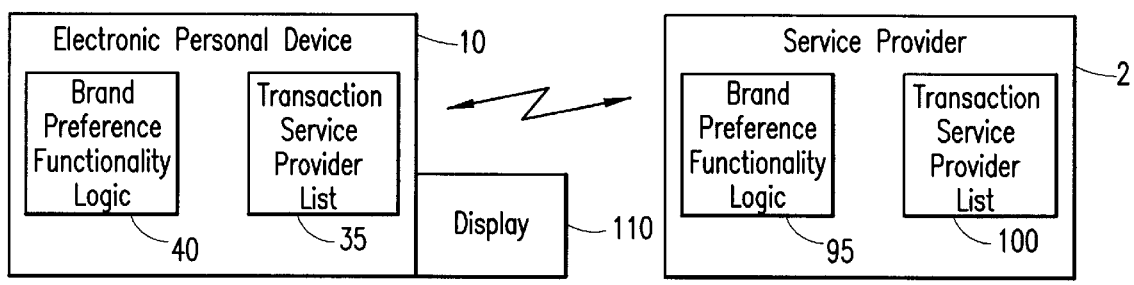
FIG. 4 is an alternative embodiment wherein the electronic personal device and service provider negotiate a brand identifier for use with a transaction.

Referring now to FIG. 4, there is illustrated an alternative embodiment of the present invention wherein both the electronic personal device 10 and the service provider 20 include brand preference functionality logic components, 40 and 95, respectively, and transaction service provider lists, 35 and 100, respectively. In this embodiment, the brand preference functionality logic 40, 95 within the electronic personal device 10 and service provider 20 each present a separate listing of specified brand identifiers with which the electronic personal device and the service provider would prefer to carry out the transaction. The lists of specified brand identifiers provided by the electronic personal device 10 and the service provider 20 are each processed using the brand preference functionality logics 40, 95 in order to negotiate a brand identifier for use with the transaction.

This negotiation process may take any form and may include, but is not limited to a process which searches through each of the lists provided by brand preference functionality logics 40 and 95, and the brand identifier having the best overall selection value between the two lists is selected. For example, the first through fifth brand identifiers may be provided a value of 1–5 respectively in each list. The value for the first brand identifier on a list would equal 1, the second brand identifier on a list would equal 2 and so forth. The values for each of the identifiers in both lists are added together. Thus, for example, if the Visa brand identifier was listed first in the electronic personal device's list and third in the service provider's list, the brand identifier for Visa would have the total score of four. The brand identifier having the lowest score is selected as the one for use with the transaction. This is, of course, merely one example of a negotiation process that may be carried out by the brand preference functionality logics 40, 95 and many other algorithms or routines may be utilized.

It should also be realized that the negotiation process could be carried out completely within the electronic personal device 10, within the service provider 20 or may involve a combined processing technique utilizing both units. The criteria involved in the negotiation process may also include the alternatives available in each of the lists, the size of the transaction involved, the transaction fees associated with the transaction, the available credit line associated with each of the brand identifiers, and the personal preferences of the electronic personal device 10 and the service provider 20. Seller preferences which offer a discount to the buyer may also affect the negotiations. The selected brand identifier may then be provided to the user via a display 110 in order for the user to approve or disapprove of the negotiated brand identifier.

The previous description is of a preferred embodiment for implementing the invention, and the scope of the invention should not necessarily be limited by this description. The scope of the present invention is instead defined by the following claims.

What is claimed is:

1. A method for presenting payment information on a display during a transaction using an electronic personal device, comprising the steps of:

storing a plurality of brand identifiers having the payment information associated therewith;

establishing a priority order for at least one brand identifiers wherein a brand identifier selected according to predetermined criteria and input from a service provider is always listed first; and displaying the at least one brand identifiers according to the established priority order.

2. The method of claim 1, wherein the step of establishing further comprises the steps of:

determining a service provider presently involved in the transaction; and establishing the brand identifier associated with the determined service provider as first in the priority order.

3. The method of claim 1, wherein the step of displaying further comprises displaying the brand identifiers according to the established priority order upon activation of the personal device.

4. The method of claim 1, wherein the step of establishing further comprises the step of specifying a particular brand identifier to always be listed first.

5. The method of claim 1, wherein the electronic personal device comprises a mobile telephone.

6. The method claim 1, further comprising the step of re-establishing the priority order responsive to new user inputs.

7. The method of claim 1, wherein the step of establishing further comprises the step of specifying the priority order based upon pre-defined situations.

8. A method for presenting payment information on a display stored within a mobile telephone during a transaction, comprising the steps of:

storing a plurality of brand identifiers having the payment information associated therewith;

receiving input from a service provider presently involved in the transaction;

establishing a brand identifier based on the input from the service provider as first in a priority order of the brand identifiers; and displaying the brand identifier according to the established priority order.

9. The method of claim 8, wherein the step of displaying further comprises displaying the brand identifiers according to a pre-established priority order upon activation of the personal device.

10. The method claim 8, further comprising the step of re-establishing the priority order responsive to new user inputs.

11. An electronic personal device for presenting payment information on a display during a transaction comprising:

a memory for storing a plurality of brand identifiers having the payment information associated therewith;

a user interface for providing user inputs;

a communications interface for receiving input from a service provider involved in the transaction;

a display for displaying the brand identifiers;

control logic responsive to the user inputs and the input from the service provider for defining a priority order to display the brand identifiers on the display.

12. The electric personal device of claim 11, wherein the control logic is responsive to activation of the electronic personal device.

13. The electronic personal device of claim 11, wherein the control logic specifies a particular brand identifier to always be listed first.

14. The electronic personal device of claim 11, wherein the control logic specifies a brand identifier providing best commercial conditions to always be listed first.

15. The electronic personal device of claim 11, wherein the control logic specifies the priority order based upon pre-defined situations.

16. The method of claim 11, wherein the electronic personal device comprises a mobile telephone.

* * * * *